April 27, 1948. C. H. MARTIN 2,440,550
TRACTOR CONVEYED IMPLEMENT AND HITCH THEREFOR
Filed Sept. 5, 1944 6 Sheets-Sheet 5
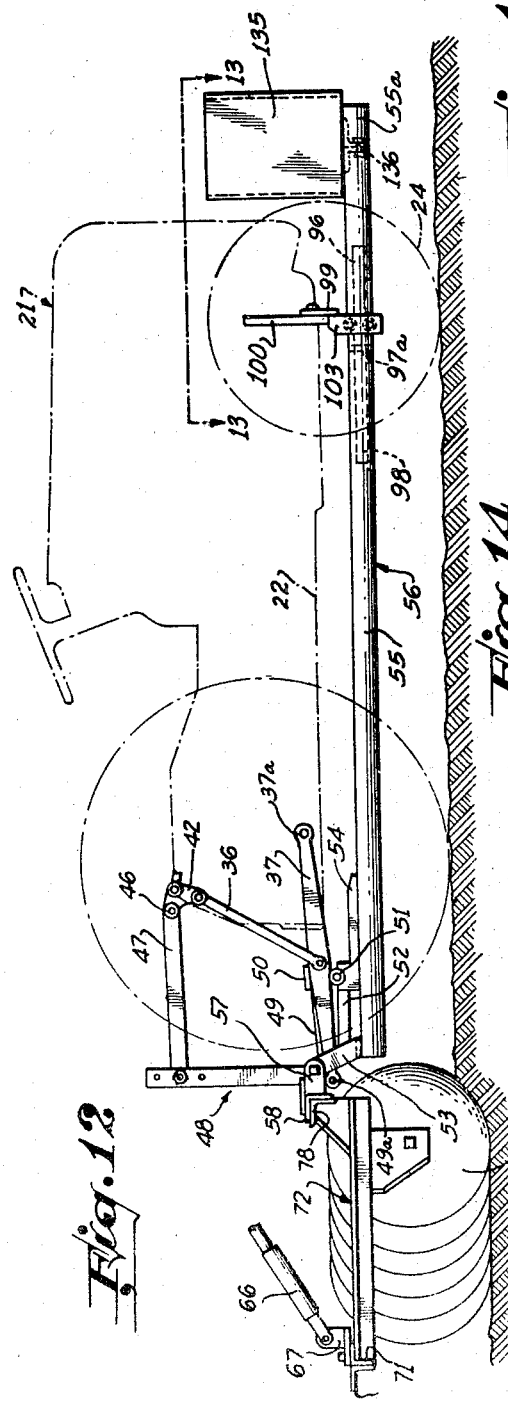
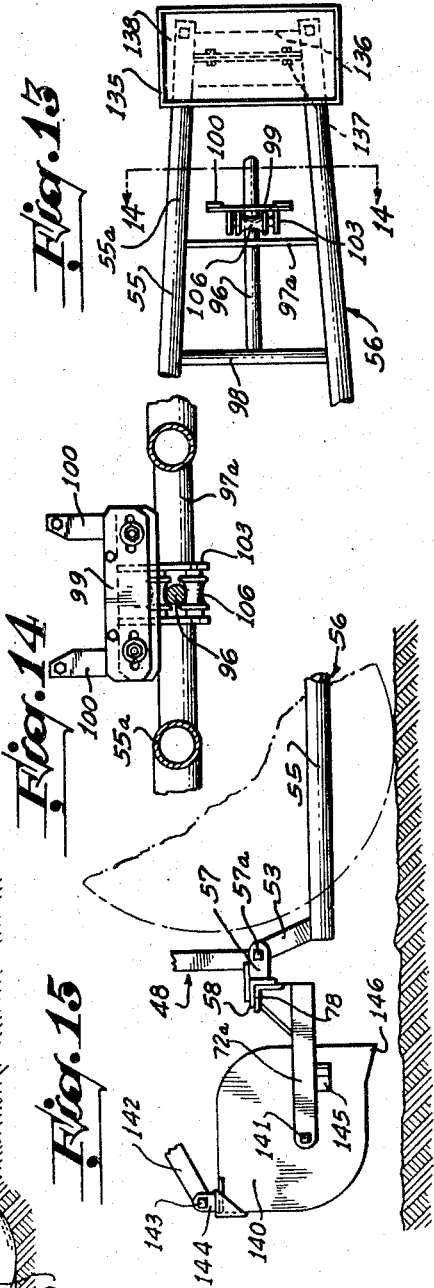
INVENTOR
CHARLES H. MARTIN
BY HARRIS, KIECH, FOSTER & HARRIS
FOR THE FIRM
ATTORNEYS

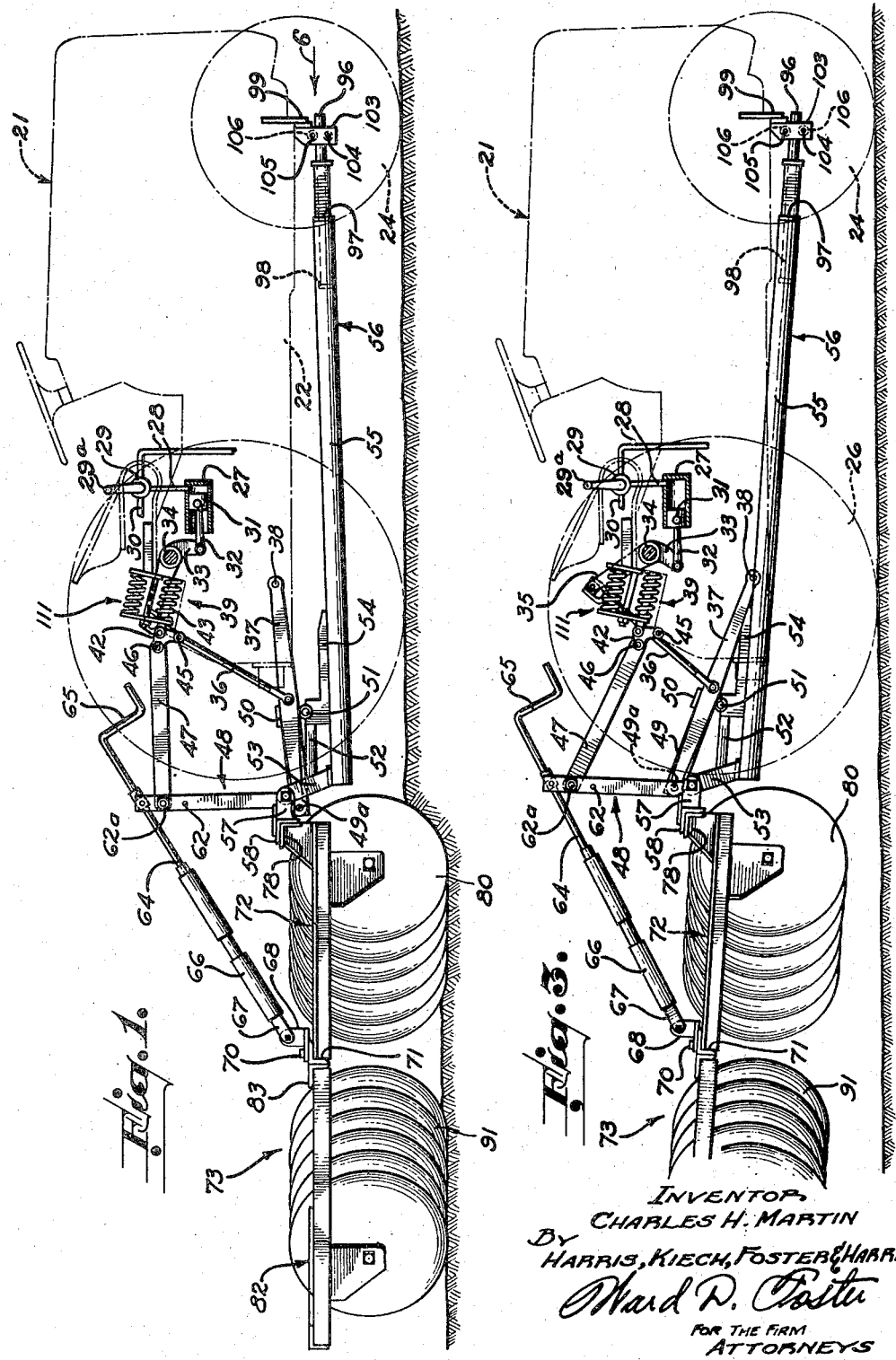

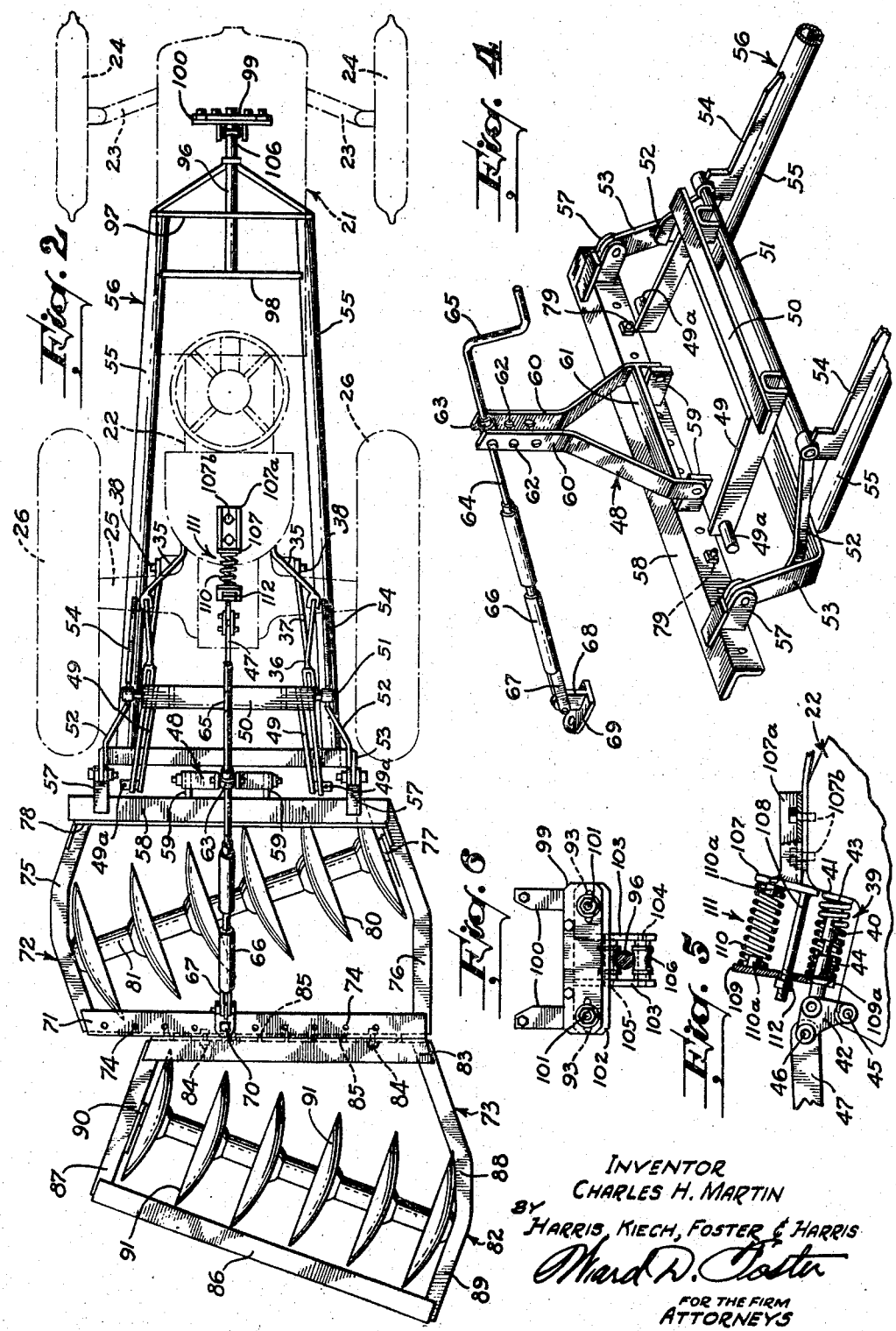

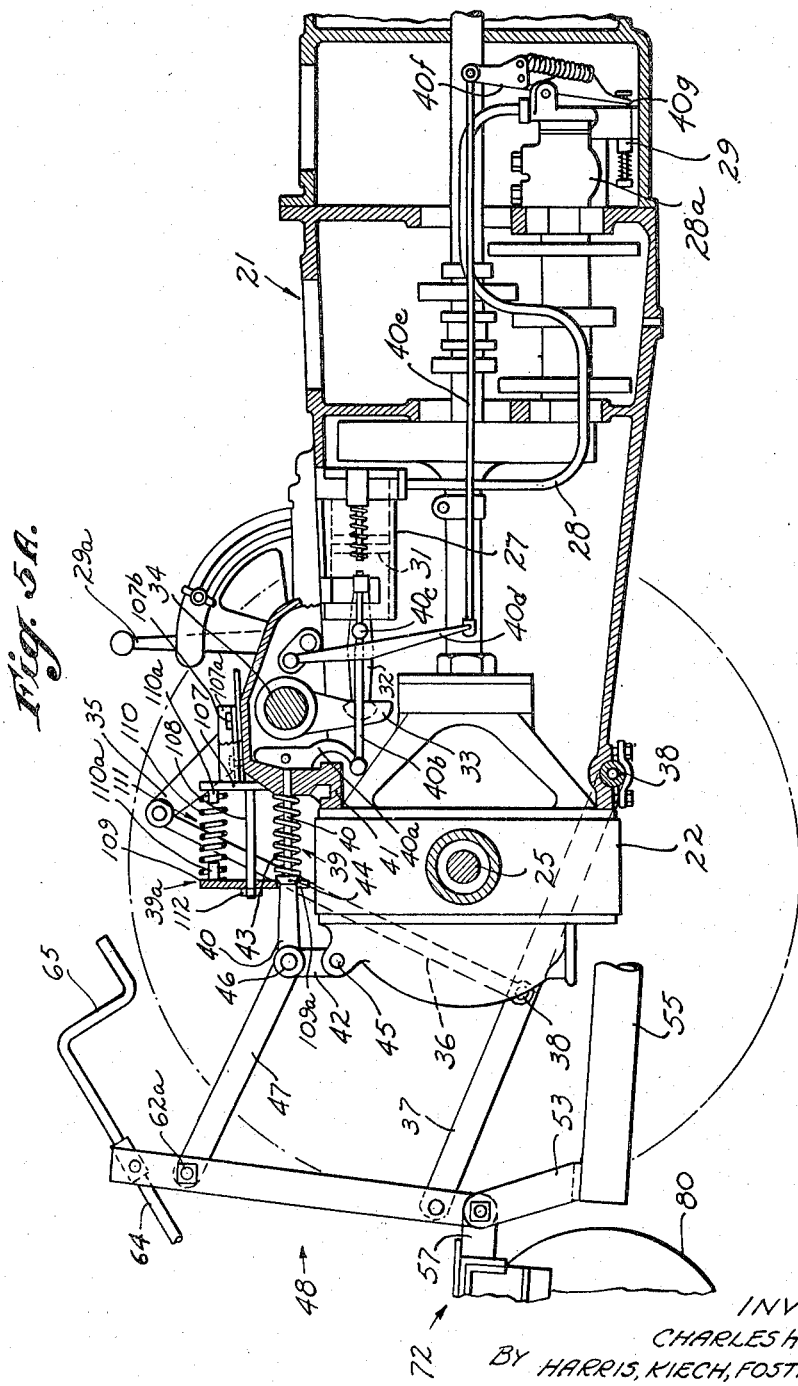

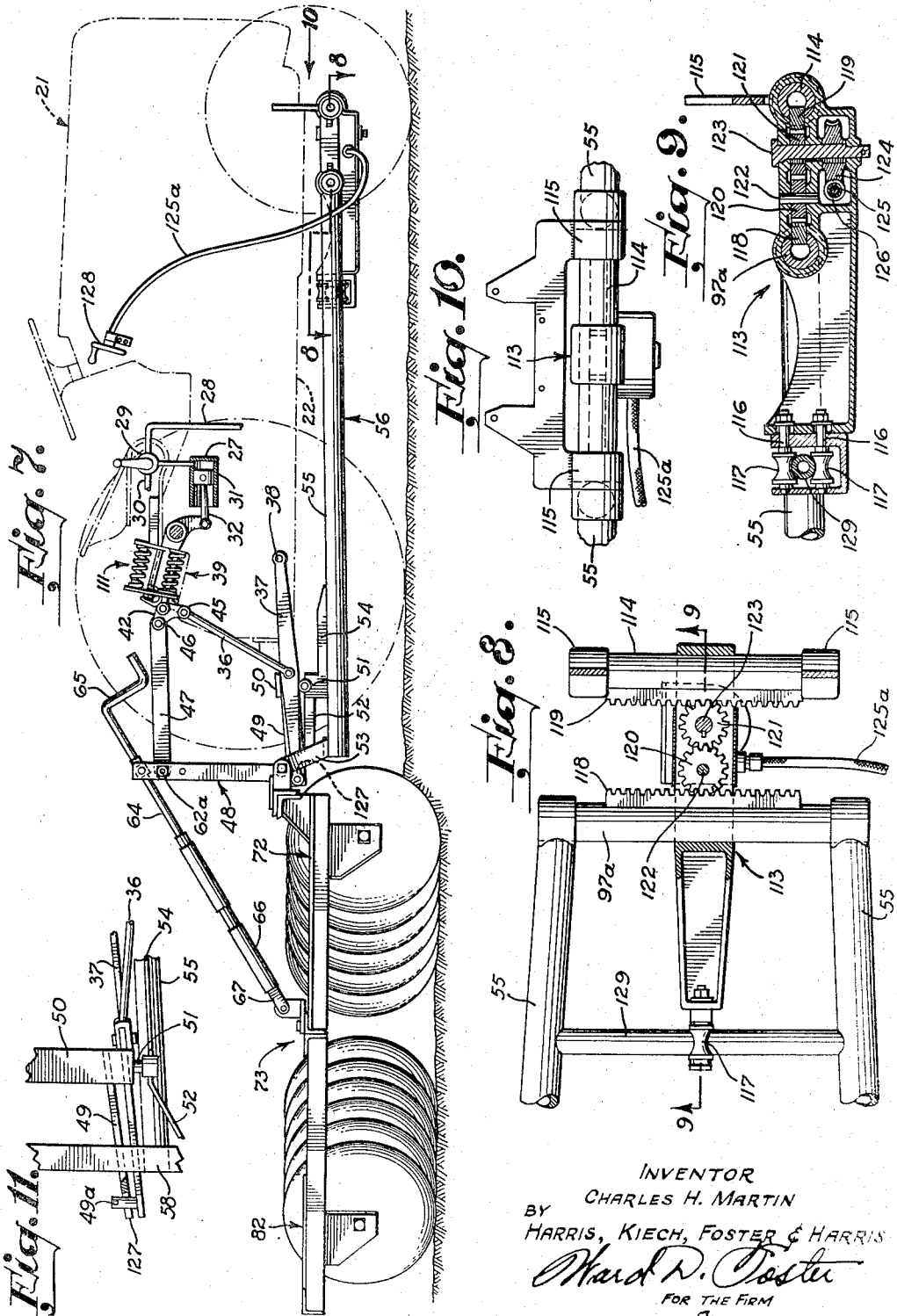

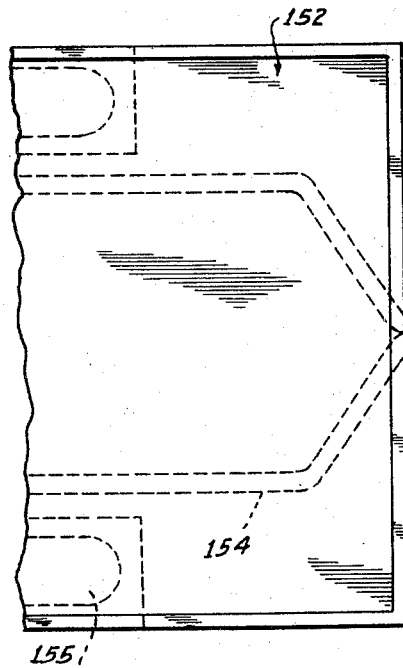
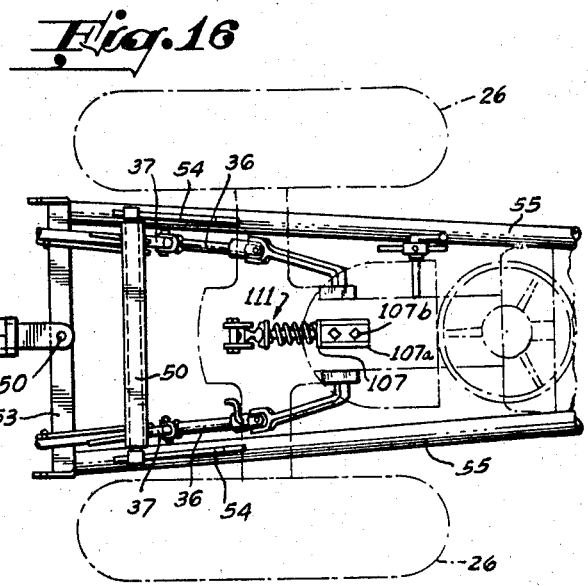
Fig. 16
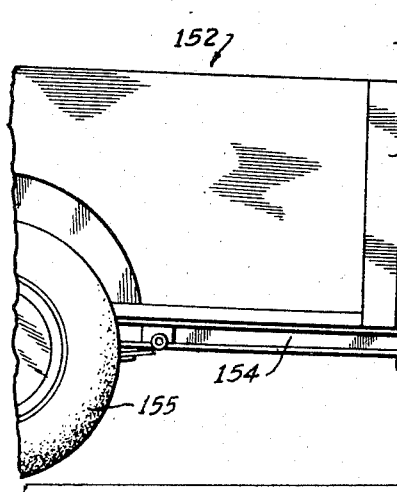
Fig. 17
INVENTOR
CHARLES H. MARTIN
BY HARRIS, KIECH, FOSTER & HARRIS
FOR THE FIRM
ATTORNEYS Patented Apr. 27, 1948

2,440,550

UNITED STATES PATENT OFFICE 2,440,550

TRACTOR-CONVEYED IMPLEMENT AND HITCH THEREFOR

Charles H. Martin, Huntington Park, Calif., assignor to Howard B. Rapp and Sally Rapp, copartners doing business as Towner Manufacturing Co., Santa Ana, Calif.

Application September 5, 1944, Serial No. 552,727

20 Claims. (Cl. 97—50)

This application is a continuation-in-part of my earlier application Serial No. 442,825, filed May 13, 1942, and issued January 14, 1947, as Patent No. 2,414,114.

My invention relates to a device conveyed by a tractive vehicle, and a hitch for connecting such device to such vehicle, and, since it finds particular utility embodied in an implement such as an offset disc harrow conveyed by a tractive vehicle, such as a tractor, the objects and advantages of my invention will be described in connection with such embodiment, it being understood that my invention is not restricted to an offset disc harrow or an implement or a hitch construction therefor adapted for connection to a tractor. For example, my invention is applicable to heavy implements in general, including those which are inherently heavy and those which are heavy when loaded as in the case of bucket scrapers and rotary scrapers, heavily loaded two-wheel trailers, and the like.

Control devices have been combined with tractors for the purpose of automatically controlling the depth of cut of an implement drawn by the tractor and for the purpose of elevating it for transportation in an inoperative position. Linkages have been provided for connecting such a tractor and such a control means to an implement, and such linkages have met with some success when applied to such implements as plows. However the problem of providing a satisfactory offset disc harrow and hitch for connecting it to such a tractor and such an automatic control means involves many problems not presented by an implement such as a plow and its connection to such a tractor and means. Also, other relatively heavy implements, or implements which are heavy when loaded, such as bucket scrapers, offer similar problems.

It is an object of the present invention to enable the draft control means on the tractor or other pulling device to function properly in conjunction with such heavy implements as those indicated above.

More particularly, it is an object to provide a compensating spring arrangement for relieving the stress imposed on the spring-urged control element of a tractor's draft control mechanism to a degree sufficient to compensate for the excess rearward moment imposed by a heavy implement.

The automatic control and elevating means customarily employed on tractors with implements other than harrows are not required to lift weights comparable with the weight of an offset disc harrow. This is for the reason that such implements as plows have a tendency to ride out of the ground and elevate themselves. The rear gang of an offset disc harrow rigidly connected to the front gang overcomes this tendency of the front gang and comprises a dead weight much greater than, and located at a greater distance from the tractor than, the weight of implements such as plows. In order for the depth control means of tractors designed for operation with such implements as plows to operate efficiently conveying a disc harrow, it is necessary to modify such means to make allowance for the increase in such weight and moment.

It is accordingly also an object of my invention to provide in an implement and hitch therefor means for modifying the depth control mechanism of a tractor to counteract the increase in weight to be elevated by such mechanism when an implement such as a plow is removed therefrom and a disc harrow is attached thereto, or other heavy implement is attached thereto or other implement which is heavy when loaded, as is exemplified by rotary scrapers and bucket-type scrapers.

A further object of my invention is to provide means for counterweighting the hitch, or for counterweighting the tractive vehicle itself, in order to counteract at least a portion of the excess dead weight of implements such as disc harrows and loaded scrapers previously mentioned.

Embodiments of my invention capable of performing these objects and providing these advantages and others are described in the following specification, which may be better understood by reference to the accompanying drawings in which:

Fig. 1 is a side elevational view of a harrow and hitch of my invention conveyed in operative position by a tractor;

Fig. 2 is a plan view of the harrow and hitch illustrated in Fig. 1;

Fig. 3 is a side elevational view of the same harrow and hitch with the harrow in its transporting position;

Fig. 4 is a fragmentary perspective view of a portion of the hitch of my invention;

Fig. 5 is an enlarged fragmentary elevational view, partially in section, of the means of my invention modifying the automatic depth control and lifting means of the tractor;

Fig. 5A is a partial longitudinal sectional elevation of the rear portion of a tractor embodying a Ferguson system for hydraulic control of an implement attached to the tractor as modified according to the present invention;

Fig. 6 is a front elevational view taken as indicated by the arrow 6 of Fig. 1;

Fig. 7 is a modified form of harrow and hitch of my invention in operative position;

Fig. 8 is a sectional view taken as indicated by the line 8—8 of Fig. 7;

Fig. 9 is a sectional view taken as indicated by the line 9—9 of Fig. 8;

Fig. 10 is a front elevational view taken as indicated by the arrow 10 of Fig. 7;

Fig. 11 is a plan view of a portion of the hitch illustrated in Fig. 7;

Fig. 12 is a side elevation corresponding with that of Fig. 1 in which a hitch carrying a disk harrow at its rear end is provided with counterweighting means at its forward end;

Fig. 13 is a fragmentary plan taken approximately from the line 13—13 of Fig. 12;

Fig. 14 is a fragmentary elevational detail taken approximately from the line 14—14 of Fig. 13;

Fig. 15 is a fragmentary side elevation indicating how a bucket scraper is carried by a hitch of my present invention;

Fig. 16 is a fragmentary plan showing a modification adapting the hitch structure of the present invention to use with heavy two-wheeled trailers; and Fig. 17 is a side elevation of the structure shown in Fig. 16.

Referring to the drawings, which are for illustrative purposes only, and particularly to Figs. 1 to 4, the numeral 21 indicates a tractor, illustrated in broken lines. The tractor 21 includes a frame 22, a front axle 23 with front wheels 24 mounted thereon, and a rear axle 25 with traction wheels 26 mounted thereon and driven through suitable mechanism by the tractor engine.

The hitch and implement of my invention illustrated in these figures may be employed with automatic depth control and elevating mechanisms of various kinds. In the drawings I have illustrated a control and elevating mechanism of a type such as disclosed in Patents No. 2,118,180 and No. 2,118,181 of H. G. Ferguson. Such a mechanism, which is illustrated in simplified form in Figs. 1, 3, 7 and 17, includes a cylinder 27 to which fluid under pressure is supplied through a line 28 from a source of supply, such as a pump driven by the engine. The flow of fluid through the line 28 is controlled by a valve 29 manually actuated by a valve control lever 29a. The valve 29 also controls the exhaust passage of fluid from the cylinder 27 through a pipe 30 to a suitable storage tank or sump. Mounted for reciprocation in the cylinder 27 is a piston 31 connected by a piston rod 32 to one end of a lever 33 pivoted at 34 intermediate its ends. The lever 33 on the opposite side of the pivot 34 is bifurcated to provide two arms 35, each of which is pivoted to the upper end of a pull rod 36, the lower end of each rod being swingably mounted upon an elevator lever or link 37. Each of the links 37 is pivoted at its forward end to the frame 22 forwardly of the rear axle 25 as indicated at 38.

The numeral 39 indicates an automatic depth control mechanism which, as best illustrated in Fig. 5 (see also Fig. 5A), includes a sliding or telescoping valve member 40 or valve-actuating rod mounted for telescoping movement between a portion 41 of the frame 22 and a bell crank 42 or shackle to which one end of the valve member 40 is secured. A compression spring 43 is mounted around the valve member 40 with one end bearing against the frame portion 41 and the other end abutting a collar 44 mounted on the valve member 40. The spring 43 resists the collapsing or inward movement of the valve member 40. One arm of the bell crank 42 is pivoted at 45 to the tractor 21, and the other arm is pivoted at 46 to one end of a link 47. The other end of the link 47 is pivotally secured to a yoke 48 adjacent its upper end.

When an implement of conventional construction and weight, for which the draft control mechanism 39 is designed, is secured to the lower end of the yoke 48 and the link 37, the valve member 40 operates to automatically provide fluid under pressure to the cylinder 27 when the draft force necessary to draw such an implement exceeds a predetermined value. This supply of fluid to the cylinder 27 rotates the arms 35 of the lever 33 forwardly, thus urging the rearward ends of the links 37 upwardly to lift the implement and diminish its resistance to forward movement, while at the same time imposing a portion of the weight of the implement upon the rearward end of the tractor 21 and increasing its traction.

In Fig. 5A there is shown substantially a duplication of Fig. 1 of the Ferguson Patent No. 2,118,180, with the difference that the control mechanism is modified to embody those aspects of my present invention by virtue of which the mechanism is adapted for operative control of certain implements presenting peculiar problems, as hereinafter fully explained. Corresponding parts of the depth control mechanism of the Ferguson system of Fig. 5A are indicated by the same reference characters as employed in the simplified form of Figs. 1, 3, 7 and 17, and additional elements of corresponding mechanical groups are, in general, indicated by corresponding numerals with letter suffixes. Thus, the cylinder 27 containing the piston 31 is supplied through the line 28 from a pump 28a by way of the valve 29 under the manual control of the quadrant control lever 29a and the automatic control of the telescoping valve member or sliding valve-actuating rod 40 which slides or collapses inwardly against the spring 43 engaged by the collar 44. The valve-actuating rod 40 is connected to and controls movement of a lever 40a which operates a rod 40b on which is mounted a moving fulcrum 40c for a lever 40d attached to a rod 40e which actuates a spring loaded lever 40f having a forked end 40g engaging and actuating the valve 29. Thus, the quadrant lever 29d and the rod 40, through the connections just described, both serve to control fluid passage through the valve 29 and the line 28.

The mechanism hereinbefore described and its operation are disclosed in the Ferguson patents hereinbefore referred to.

In accordance with my invention the rearward ends of the links 37 are not secured to an implement but are pivotally secured by pins 49a to return bars 49, which extend forwardly to adjacent the connection of the rods 36 to the links 37. The forward ends of the return bars 49 are secured between a crossbar 50 and a transverse shaft 51. Metal straps 52 are secured to the ends of the transverse shaft 51 and are connected at their rearward ends to a stirrup member 53. The ends of the transverse shaft 51 and the forward ends of the metal straps 52 are attached to bracket members 54, which are secured to longitudinal members 55 of a lever or sub-frame 56.

The rearward ends of the stirrup 53 are pivoted between lugs 57 carried by a front frame connection 58 in the form of an angle. The angle 58 is adapted for attachment to the transverse member of a front gang of a two-gang disc harrow in a manner which will be described.

Adjacent its center, the angle 58 is provided with forwardly extending lugs 59 to which the lower ends of arms 60 of the yoke 48 are pivoted. The yoke 48 includes the arms 60, which converge upwardly, and a transverse brace 61 extending between them adjacent the lugs 59. The arms 60 are provided with a plurality of aligned openings 62 for the reception of a bolt 62a to connect the link 47 to the yoke 48 at various levels.

Pivoted between the upper portion of the arms 60 is a bearing 63. A shaft 64 is rotatably mounted in the bearing 63, so that it is restrained against axial movement relative thereto. The shaft 64 is provided with a crank 65 at its upper end, and its lower end is threaded into a sleeve 66 connected to a bracket 67 pivoted to a lug 68. The lug 68 is mounted upon a plate 69 secured by a bolt 70 to a rear transverse member 71 of a front frame 72 of a drag device or trailing device in the form of a two-gang disc harrow 73. A plurality of openings 74 are provided along the rear transverse member 71, so that the plate 69 may be secured at a plurality of positions along this transverse member 71.

The front frame 72 includes end members 75 and 76 angled to provide parallel portions normal to a shaft 77 connected thereto. The shaft 77 is at the desired working angle with the path of travel of the implement. The end members 75 and 76 are connected by the rear transverse member 71 and a front transverse member 78.

The transverse member 78 is in the form of an angle and is adapted for nesting in the angle 58 previously described. The angles 58 and 78 are provided with a plurality of openings in their vertical legs for the reception of bolts 79, so that the front frame 72 may be secured to the angle 58 in numerous positions of offset or directly behind the tractor 21.

Mounted upon the shaft 77 for rotation thereon are a plurality of discs 80 separated by spacing spools 81.

Attached to the front frame 72 is a rear frame 82 which includes a front transverse member 83 in the form of an angle, the vertical leg of which is adapted for being clamped to the vertical leg of the rear transverse member 71 of the front frame 72 by bolts 84 passing therethrough. A plurality of openings 85 for the bolts 84 are provided in the legs of both the transverse members 71 and 83, so that the rear frame 82 may be moved transversely to any desired position relative to the front frame 72 and secured thereto. The rear frame 82 includes also a rear transverse member 86 in the form of an angle and end members 87 and 88.

The end member 87 is secured to the rear transverse member 86 at right angle thereto and to the front transverse member 83 at an obtuse angle, the end member 88 connecting the opposite ends of these transverse members and being provided with a portion 89 at right angle to the rear transverse member 86. Connecting the portion 89 of the end member 88 and the end member 87 is a shaft 90 upon which are rotatably mounted a plurality of discs 91 held in their proper spaced relationship by spools 92. The shaft 90, like the shaft 77, makes an angle equal to the desired working angle with the transverse members 83, 71, and 78. A suitable working angle may be of the order of 20°.

The lower ends of the longitudinal members 55 of the sub-frame 56 are attached to the stirrup member 53 and extend forwardly to adjacent the front axle 23 where they are connected by a transverse bar 97. A transverse brace 98 connects the longitudinal members 55 near their forward ends and a cylindrical pin 96 attached to the brace 98 at its center extends through the transverse bar 97 and forwardly of a plate 99 attached by arms 100 to the frame 22 of the tractor 21. The plate 99 is attached by bolts 101 to a rearward plate 102 having transversely elongated openings 93 for the reception of the bolts 101 to permit the transverse adjustment of the plates 99 and 102.

Secured to the rearward plate 102 are depending lugs 103 connected by pins 104 and 105 upon each of which there is mounted a roller 106 of hourglass form. The rollers 106 are spaced to receive between them the pin 96 to restrain motion of the pin 96 and the forward part of the sub-frame 56 transversely relative to the tractor frame 22, while permitting the sub-frame 56 to move longitudinally relative to the frame 22.

The spring 43 of the automatic depth control mechanism 39 customarily employed upon such tractors is made of such resistance to deformation as to be compressed sufficiently to effect automatic lifting of a conventional attached implement when the latter is subjected to a predetermined draft load. This automatic lifting of such a conventional implement results from the increased resistance to forward motion of the implement, urging the link 47 forwardly, compressing the spring 43, and telescoping the valve member 40 to supply fluid under pressure to the cylinder 27 and thus through the lever 33 and rods 36, lifting the links 37 and attached implement upwardly.

In the event that the weight of the implement attached to the tractor 21 and the automatic depth control mechanism 39, or the moment of such implement exerted upon the depth control mechanism is greater than the weight or such moment of the conventional implement for which the depth control mechanism is designed, it is necessary to apply a compensating force to the spring 43 although the implement offers a resistance to forward motion substantially equal to the resistance to forward motion of such a conventional implement penetrating the soil to the same depth. Likewise, in the event that there is attached to the tractor 21 and the depth control mechanism 39 an implement of substantially the same weight as such a conventional implement, but which, due to its type of construction or means of attachment to the tractor or depth control mechanism, offers less resistance to forward motion when penetrating the soil to the desired maximum depth than such an implement of conventional construction, it is necessary to apply a compensating force to the spring 43. This compensating force is of such value that the spring 43, under these varying conditions, will permit movement of the telescoping valve member 40 to automatically control the depth in the same manner as when such a conventional implement is employed.

Due to the fact that the harrow 73 is of considerably greater weight than such a conventional implement for which the depth control mechanism 39 is designed, it is necessary to compensate the spring 43 by compressing it an amount which is a function of such difference in weight. The automatic depth control mechanism thus far described is provided with a compensating mechanism 111 adapted for compensating the spring 43 when there is attached to the depth control mechanism an implement of greater weight or one offering less resistance to forward motion than such a conventional implement.

This mechanism 111 includes, as shown in

Figs. 5 and 5A, a plate 107 having formed thereon a bracket 107a secured to the tractor 21 by bolts 107b. The plate 107 has mounted thereon a pivot pin 108 projecting rearwardly therefrom substantially parallel to and above the valve member 40. A plate 109 is loosely mounted upon the pin 108 and is provided with legs 109a projecting around the valve member 40 in contact with the rearward side of the collar 44. The legs 109a are urged forwardly, and the upper end of the plate 109 is urged rearwardly by an auxiliary pressure means in the form of a compression spring 110 retained in place between the plates 107 and 109 by an inwardly extending projection or boss 110a provided upon each of them. A nut 112 is threaded upon the pivot pin 108 against the plate 109, so that the plate 109 is caused to compress the spring 110 sufficiently to compensate for the increased weight of the harrow 73 over the weight of the conventional implement for which the depth control mechanism 39 is designed. While the compensating mechanism of my invention has been described with specific reference to a disc harrow attached to the tractor and the automatic depth control mechanism of the tractor, it will be understood that this compensating mechanism may with equal advantage be employed in connection with any pulling device having thereon an automatic depth control or lifting mechanism and in connection with any trailing device which is of greater weight than, or exerts upon the automatic depth control or lifting mechanism a moment greater than, the weight or moment of the trailing device for which the control or lifting mechanism is designed or any trailing device which, although of approximately the same weight and exerting approximately the same moment upon the control or lifting mechanism as the trailing device for which such control or lifting mechanism was designed, offers less resistance to forward motion than the device for which the control or lifting mechanism was designed.

The harrow being in the operative position illustrated in Fig. 1, draft force is applied to the harrow through the transverse shaft 51, straps 52, stirrup member 53, bracket member 54, subframe 56, and lugs 57, which may be regarded as draft means. When this draft force necessary to propel the harrow increases, the links 37 are caused to swing upwardly because the increased force exerted through the yoke 48 and the link 47 moves the valve member 40 inwardly to a more collapsed position, thus resulting in supplying fluid under pressure to the piston 27. This fluid forces the piston 31 outwardly, swinging the arms 35 of the lever 33 forwardly and pulling the rods 36 and the links 37 upwardly, the lever 33, rods 36, and links 37 and 47 constituting an elevating linkage, and the return bars 49, crossbar 50, transverse shaft 51, straps 52, stirrup members 53, and lugs 57 constituting a first linkage, and the yoke 48, bearings 63, shaft 64, sleeve 66, and bracket 67 constituting a second linkage, the two linkages together constituting a linkage connecting the implement to the power lift mechanism so that the implement may be drawn by the tractive vehicle and lifted by the power lift mechanism. The upward movement of the links 37 causes the harrow to be elevated to penelinks 37 causes the harrow to be elevated to penetrate the ground to a lesser depth, thus reducing the draft pull necessary to propel it to that predetermined value determined by the resistance of the spring 43 opposed by the spring 110 to the collapsing of the valve member 40. The lifting of the implement imposes upon the tractor 21 a part of the weight of the implement, increasing the pressure of the rear wheels 26 against the ground and thus increasing the traction of the tractor.

When the draft pull necessary to propel the implement has diminished below the predetermined value for which the springs 43 and 110 are set, the spring 43 urges the plate 109 rearwardly, moving the valve member 40 to outward or extended position and permitting the harrow to be lowered by gravity relative to the tractor to penetrate the ground to a greater depth.

The front frame 72 and the rear frame 82 of the harrow 73 being rigidly connected together and the front frame 72 being lifted and lowered substantially vertically by this automatic depth control operation, the two frames 72 and 82 are maintained in substantially the same plane through the elevation and lowering.

When it is desired to elevate the disc harrow 73 from its operative position illustrated in Fig. 1 to its transporting position illustrated in Fig. 3, the control lever 29a for the valve 29 is actuated by the operator from his place on the tractor to cause fluid under pressure to be admitted to the line 28 and cylinder 27, moving the piston 31 outwardly and swinging the arms 35 of the lever 33 forwardly. This exerts tension on the rods 36 and causes the links 37, crossbar 50, and transverse bar 51 to swing upwardly.

The front frame 72, being connected to the transverse shaft 51, and through the yoke 48 and link 47 to the tractor, is thus moved upwardly, and the rear frame 73, being rigidly connected to the front frame 72, is likewise elevated so that the discs 80 and 91 of the two frames remain in substantially the same plane. When it is desired to lower the disc harrow 73 to its operative position, it is necessary only for the operator to manipulate the control lever 29a so that the fluid under pressure in the cylinder 27 is permitted to exhaust through the outlet line 30 to the storage tank of the system, whereupon the weight of the disc harrow 73 causes it to descend to a depth of ground penetration predetermined by the setting of the automatic depth control mechanism 39.

If at any chosen depth of penetration or degree of offset of the disc harrow 73 relative to the longitudinal axis of the tractor 21 the operator finds that the harrow is exerting any side draft or transverse forces upon the tractor, they are readily overcome by his manipulation of the crank 65 operating connecting means which includes the yoke 48, bearing 63, shaft 64, sleeve 66, and bracket 67. Thus, when the disc harrow 73 is offset to the right of the tractor 21, looking in the direction of travel, if there is any tendency for the side draft or transverse forces of the harrow upon the tractor to cause the tractor to veer to the right, this tendency may be overcome by rotation of the crank 65 in such direction as to lengthen the distance between the lug 68 and the yoke 48 to thus permit the rear gang to penetrate the ground to a greater depth. Such deeper penetration increases the side draft or transverse forces applied by the disc harrow 73 to the tractor 21, tending to cause it to veer to the left, resulting in an equilibrium of such forces, permitting the tractor to follow a perfectly straight course without special attention from the operator.

Such side draft or transverse forces may be overcome also by adjusting the relative positions of the plates 99 and 102 to move the point of attachment of the sub-frame 56 transversely on the tractor 21. This is accomplished by loosening the bolts 101 and moving the plate 102 laterally and securing it in its desired position by the bolts 101. Thus, if the side draft or transverse forces exerted by the harrow in offset position upon the tractor tend to cause the tractor to veer to the right, the rearward plate 102 is moved to the right of its central position. This causes the upward force exerted by the pin 96 upon the tractor 21 to be exerted to greater extent upon the right front wheel than upon the left front wheel, thus overcoming the tendency of the harrow to turn to the right. Such an upward force is directed by the pin 96 as a result of the tendency of the weight of the harrow 73 to rotate the forward end of the sub-frame 56 upwardly whenever any of the weight of the harrow is supported by the tractor. By such a transverse movement of the point of application of this upwardly directed force, the side draft or transverse forces resulting from the operation of the harrow in any degree of offset can be completely overcome by the manipulation of the crank 65, as previously described, while securing any desired depth of penetration of the discs.

Inasmuch as the return bars 49, crossbar 50, and transverse shaft 51 cause the weight of the harrow 73 to be applied to the links 37 immediately adjacent the connection of the links 37 to the rods 36, instead of at the ends of the links 37 which are at a distance from such points of connection substantially equal to the distance between such points and the pivoted ends of the links 37 and cause the transverse frame members 78 and 83 always to remain at right angles to the longitudinal axis of the tractor, thus permitting the center of gravity of the harrow 73 to be as close as possible to the tractor, it will be seen that the implement and hitch of my invention provide a linkage by which an implement of the maximum weight may be lifted with the application of the minimum force through the rods 36. Such features permit an implement, such as the disc harrow 73, to be elevated either to vary its depth of cut or to transport it in inoperative position with the minimum power from the elevating mechanism.

Whenever any of the weight of the harrow 73 is carried by the tractor 21, an upwardly directed force is exerted upon the tractor, since the harrow 73 is suspended behind the tractor. This upwardly directed force is applied by the pin 96 at a point substantially in alignment with the front axle 23. The application of this force at such point provides a lever arm of maximum length, since this point is spaced as far forwardly as possible from the points of connection of the rods 36 to the links 37. The implement and hitch of my invention therefore apply the upwardly directed force resulting from the lifting of the implement with the greatest possible mechanical advantage, so that such force is of the minimum value.

This upwardly directed force, if applied adjacent to the rear wheels of the tractor, would have a component or moment tending to lift the rear wheels of the tractor and impair the traction of the tractor.

From the foregoing it will be seen that the implement and hitch of my invention reduce to a minimum the component of such upwardly directed force which is applied to the rear wheels, impairing their traction, by exerting this force as near as possible to the front wheels of the tractor.

The side draft forces applied to the tractor by the harrow in operation are applied to the links 37 and rods 36 adjacent their connection with each other instead of at the ends of the links 37, so that the moment of these forces tending to cause the front wheels to change their direction of travel is greatly reduced. Further, these side forces are resisted by the rigid sub-frame 56 reinforced against deformation.

Since the forces applied to the tractor, resulting from the tendency of the harrow in operation to rotate about its longitudinal axis, are applied through the long sub-frame 56 instead of through the much shorter lengths of the depth control and elevating mechanism, it will be seen that my invention reduces the effect of such forces upon the tractor to a minimum.

When it is desired to move the harrow 73 to offset position, it is necessary only to remove the bolts 79 and move the front frame 72 laterally relative to the angle 58 and again connect them by the bolts 79 and in a similar manner shift the connection of the plate 69 to the rear transverse member 71 of the front frame 72. Because the front transverse members 78 and 83 of the frames 72 and 82 are at all times at right angles to the longitudinal axis of the tractor 21, the movement of the harrow 73 to a position of any degree of offset and movement of the frames relative to each other do not change the distance between the center of gravity of the harrow 73 and the control mechanism of the tractor 21, so that the force required to elevate the implement to vary its depth of cut or to move it to transporting position remains constant for all of its positions of offset and all of the relative positions of the two gangs.

When it is desired to disconnect the implement and hitch of my invention from the tractor, it is necessary to remove the pins 49a from the links 37 and to remove the bolt connecting the link 47 to the yoke 48, whereupon the tractor may be driven forwardly until the pin 96 is moved out of contact with the rollers 106. It will be apparent that the implement and hitch of my invention may be again attached to the tractor 21 with equal facility.

The compression of the spring 43 by the plate 109 due to the action of the spring 110 counteracts the effect upon the action of the spring 43 resulting from the excess of the weight of the harrow 73 over the lighter implement customarily employed with the depth control mechanism 39, so that it operates with this greater weight in the same manner that it operated with the lesser weight.

In Figs. 7 to 11, inclusive, which illustrate another embodiment of implement and hitch of my invention, also capable of performing the objects and providing the advantages hereinbefore set forth, like numbers are employed to indicate elements like those illustrated in Figs. 1 to 6 and previously described.

In this embodiment of my invention draft force is applied to the disc harrow 73 at the front end of the sub-frame 56 instead of through the return bars 49, the sub-frame 56, bracket members 54, stirrup member 53, straps 52, transverse shaft 51, and lugs 57 acting as draft means. The transverse bar 97a passes through a housing 113 through which a transverse member 114 also extends with its ends connected by hangers 115 to the frame 22 of the tractor 21. The housing 113 extends rearwardly of the transverse member 97a and is provided with rearwardly extending shafts 116. A roller 117 is secured upon each of the shafts 116 for rotation relative thereto. The rollers 117 are hourglass in form and spaced to receive between them a transverse brace 129 which is connected to the longitudinal members 55 of the sub-frame 56.

The transverse bar 97a is provided with a rack 118 which projects forwardly therefrom. A similar rack 119 is provided on the transverse member 114 and projects rearwardly therefrom. Gears 120 and 121 are disposed within the housing 113 and mesh with the racks 118 and 119, respectively, and with each other. The gear 120 is rotatably mounted upon a pin 122 which is secured in the housing 113. The gear 121 is non-rotatably mounted upon a shaft 123 which has secured thereto a driving gear 124. A worm gear 126 is mounted upon a shaft 125 in the housing 113 for rotation by a flexible shaft connected thereto and extending through a flexible conduit 125a to a hand wheel 128 mounted upon the tractor 21 within reach of the driver.

With the construction described the driver of the tractor may by rotation of the hand wheel 128 rotate the worm gear 126, thus driving the driving gear 124 and causing the shaft 123 to rotate. The rotation of the shaft 123 causes the meshing gears 120 and 121 to rotate in opposite directions, and these gears, meshing with the racks 118 and 119, travel along the racks in the same direction and at the same rate of speed. As the housing moves transversely of the tractor 21 the rollers 117 roll along the transverse brace 129, retaining the housing 113 parallel to the longitudinal axis of the tractor 21 during its travel. In this manner the driver of the tractor may, during travel of the tractor, alter the point at which forces are applied by the sub-frame 56 to the tractor.

Whenever the disc harrow 73 is moved vertically relative to the tractor 21 in the embodiment of my invention illustrated in Figs. 1 to 6, there is longitudinal movement of the sub-frame 56 causing the pin 96 to move longitudinally upon the rollers 106. In the embodiment of my invention illustrated in Figs. 7 to 11, however, the forward end of the sub-frame 56 is restrained against longitudinal movement relative to the tractor 21.

In this form of my invention horizontal movement of the harrow during its vertical movement relative to the tractor 21 is permitted by providing an elongated opening 127 in each of the return bars 49 for the reception of the pin 49a connecting it to the link 37. The movement of the pins 49a in the elongated slots 127 permits a relative horizontal movement of the links 37 together with the tractor 21, to which they are connected, and the return bars 49 together with the sub-frame 56 to which they are connected.

While the harrow illustrated and described as an illustrative embodiment of my invention is a two-gang disc harrow, it will be apparent that my invention may with equal facility be applied to and employed with a multiple-gang disc harrow.

Also, my invention is applicable to other heavy implements than disc harrows, such as rotary scrapers, the bucket-type scraper illustrated in Fig. 15, heavy trailers or semi-trailers as shown in Figs. 16 and 17, brush shredders, and other implements that have heavy front weight.

In Figs. 12, 13 and 14 there is shown means for counterweighting heavy implements such as above-described. As illustrated in these figures, the longitudinal members 55 of the sub-frame 56 are extended forwardly of the tractor 21 whereby to form a support for counterweighting means 135. Thus, the members 55 have forward extensions 55a, and between the extremities of these extensions angle irons 136 are secured as by welding their ends to the extensions. In the arrangement shown, the angle irons 136 have abutting webs secured together as by means of bolts 137. The forward framework thus formed supports the weighting means 135 which is secured in any desired manner such as indicated at 138. The weighting means 135 may be in the form of any desired heavy body providing sufficient weight, or it may be in the form of a receptacle, as indicated, which is adapted to receive suitable weighting material such as rocks, earth and sand, in sufficient quantity to provide the desired weight. Also, by employing loose material for the counterweighting purposes, adjustment of the counterweight with respect to the implement being employed may be readily effected. The counterweighting device 135 will ordinarily be disposed at such a position in front of the tractor 21 and between the path of its wheels 24 as not to interfere with the turning of the wheels 24. In other words, the weighting device 135 would ordinarily be arranged within the turning radius of these wheels.

Except for the extensions 55a, the forward portion of the sub-frame 56 has substantially the same construction as that shown in Figs. 1, 2 and 3, the transverse brace 98 and the supporting pin 96 being the same, although the transverse bar 97 is replaced by a transverse bar 97a whose ends are welded to the sides of the members 55 rather than to their extremities. Also, the same rollers 106 are employed to support the pin 96, the rollers 106 being carried on the tractor by the same lugs 103, plate 99 and the arms 100, as used in the form of Figs. 1 to 6.

In Fig. 15 a bucket-type scraper 140 has been substituted for the disc harrow of Figs. 1 to 12. The counterweighting means 135 also is advantageously used with this type of implement because, when the scraper is loaded, it is relatively much heavier than the ordinary implement required to be drawn and lifted by tractors. In this modification, the end walls of the scraper 140 are pivoted at 141 on the ends of frame members 72a. As in the case of frame members 72 of the forms of Figs. 1 to 12, the members 72a are carried by that portion of the sub-frame structure 56 which comprises the transverse angle iron members 58 and 78 and the brackets or lugs 57 on which the members 58 and 78 are mounted, the lugs 57 being pivoted at 57a upon the upper ends of the stirrup arms 53 mounted on the longitudinal members 55 of the sub-frame 56 as in the other forms. Thus, as the sub-frame 56 is raised and lowered, the scraper 140 is raised and lowered. For the purpose of operating the scraper to and from dumping position, a link 142 is pivotedly mounted at 143 on a bracket 144 secured to the rear edge of the scraper 140. A projecting stop 145 on each end of the scraper 140 is adapted to engage the under edge of the adjacent frame member 72a for limiting the movement of the scraper 140 about the pivots 141 when it returns from dumping position to the scraping position illustrated. While the scraper 140 when empty imposes no more load on the carriage mechanism than an ordinary implement, nevertheless, when it is loaded with earth it imposes a heavy load which is then desirably counterweighted by the counterweighting means 135.

It will be apparent from the structure indicated in Fig. 15 that lowering of the sub-frame 56 and its side members 55 by the mechanism heretofore described brings the scraper 140 into operative position so that its digging lip 146 is caused to penetrate the earth as the tractor is drawn forward, thereby filling the scraper 140. When the lifting mechanism is actuated to raise the sub-frame 56 and the scraper 140 for transport of the earth to a dumping location, the heavy earth load imposed upon the frame 56 and its lifting and supporting mechanism is nicely counterbalanced until the load is dumped by actuation of the link 142.

In Figs. 16 and 17 the sub-frame 56 and its connection with the tractor frame 22 is shown in a form adapted to support the forward end of over-balanced two-wheeled trailers carrying heavy loads. In this modification the sub-frame 56 comprises the same longitudinal members or levers 55 as in the other forms, the rearward ends of these being supported upon the tractor frame 22 through the medium of the same brackets 54, bearings 51, return arms 49, elevator levers 37 and lifting rods 36, as in the other forms. Also, the same stirrup 53 is employed. In this modification the yoke structure 48 which is pivoted to the upper ends of the stirrup 53 is omitted, and the main transverse bar of the stirrup 53 between the longitudinal members 55 is provided with means such as an opening to receive attaching means such as a pin 150 for connecting a trailer 152. In the form shown, the trailer 152 comprises a body 153 mounted on a suitable frame 154 carrying two wheels 155. The forward end of the frame 154 is shown as converging into a tongue 154a which is firmly secured to a coupling device 156 which is shown in the form of two arms whose forward ends are spaced to receive between them the main bar of the stirrup 53. The trailer body 153 is intended to represent any over-balanced or two-wheeled trailer structure carrying a heavy load at its forward end. Such a heavy load may be represented by a power driven mechanism being drawn by a tractor through a field to perform various operations, of which brush shredders are examples, or to carry other heavy loads.

By employing the form of connection shown in Figs. 16 and 17 the weight of the load carried by the trailer 152 is well distributed for various purposes. Thus, a portion of the weight, which might, for example, be one-third of the load in the trailer 152, is transferred to the rear wheels 26 of the tractor whereby to increase the traction of the wheels 26 and at the same time relieve the trailer wheels 155 of part of the load. Such a construction also makes it convenient to carry operating devices such as brush shredders in a location close to the earth during operations, this being possible by lowering the rear end of the sub-frame 56 through the actuation of the manually controlled lever 29a and its valve 29 to exhaust the fluid from the cylinder 27 and thereby permit the lifting rods 36 and levers 37 to descend. Thus, through means of the control valve 29, the position of the forward end of the trailer 152 may be maintained at any desired level. For these purposes, the automatic depth control mechanism is disconnected, and the piston 31 and lever 33 are actuated solely through the manual control of the valve 29.

While those embodiments of my invention hereinbefore illustrated and described are fully capable of performing the objects and providing the advantages hereinbefore stated, there are various other embodiments likewise capable of performing these objects and providing these advantages, and I therefore wish my invention to be understood as not restricted to the specific embodiments hereinbefore described.

I claim as my invention:

1. In a compensating mechanism for connection to a tractor having an automatic depth control mechanism operable to lift an implement of predetermined resistances to elevation and forward motion attached thereto upon compression of a spring to a predetermined extent by increase in resistance to forward motion of such implement beyond a predetermined value, the combination of: auxiliary spring means associated with the tractor; adjustable compressing means adapted for compressing said auxiliary spring means; and means connecting said compressing means and adapted for applying a compressive force, responsive to the compression of said auxiliary spring means, to the spring during its compression, whereby the spring is compressed to such predetermined extent by increase in resistance to forward motion of an implement of greater resistance to elevation or lesser resistance to forward motion than such predetermined resistances.

2. In a compensating mechanism for connection to a tractor having an automatic depth control mechanism operable to lift an implement of predetermined resistances to elevation and forward motion attached thereto upon movement of a member to a predetermined extent by increase in resistance to forward motion of such implement beyond a predetermined value, the combination of: auxiliary pressure means associated with the tractor; adjustable compressing means for compressing said auxiliary pressure means; and means connecting said compressing means for applying a compressive force, responsive to the compression of said auxiliary pressure means, to the member, whereby the member is moved to such predetermined extent by increase in resistance to forward motion of an implement of greater resistance to elevation or lesser resistance to forward motion than such predetermined resistances.

3. In a hitch for connecting an implement to a tractor having front wheels and a power lift mechanism for lifting the implement, the combination of: a linkage for connecting the implement and mechanism, whereby the implement is lifted by the mechanism; a lever constituting a part of said linkage and having a portion extending forwardly therefrom; means for connecting said lever to a forward portion of the tractor adjacent the latter's front wheels, whereby the implement is drawn; and counter-weighting means carried on the forward portion of said lever in opposition to lifted weight of said implement.

4. A hitch for connecting an implement to a tractor having a power lift mechanism for lifting the implement, comprising the combination of: a linkage for connecting the implement and mechanism, whereby the implement is lifted by the mechanism; a lever connected to a part of said linkage and extending forwardly therefrom; means connecting said lever to a forward portion of the tractor, whereby draft force is applied to the implement and the weight of the forward portion of the tractor is applied in opposition to the entire lifted weight of the implement; means constituting an extension of said lever and disposed forwardly of said tractor; and counterbalancing means connected with said forwardly disposed extension for opposing said lifted weight of said implement.

5. Means for hitching a trailing device to a pulling device equipped with an automatic traction control mechanism including a power lift and a control member biased against movement in one direction by a control spring, said hitching means comprising: a draft linkage for detachably coupling the trailing and pulling devices together and including a link arranged to apply thrust to the spring-urged control member upon an upward and forward rocking of the trailed device with reference to the pulling device; a compensating spring; and means applying pressure from said compensating spring to said control spring for compensation of the rearwardly overhanging weight of the trailed device.

6. Hitching means according to claim 5 wherein the draft means is provided with a forwardly extending portion, and means is connected with said forwardly extending portion for counterbalancing weight of a trailing device.

7. Hitching means according to claim 5 wherein the draft means includes a frame extending forwardly of the pulling device, and counterweighting means on the forward end of said frame for counterbalancing weight of the trailing device.

8. Means for hitching a trailing device to a pulling device and a depth control mechanism, which includes: draft means for coupling the two devices together and including means adapted to be connected with the trailing device and means adapted to be connected with the pulling device; compensating means operably connected to the depth control mechanism for varying its responsiveness to variations in tractive force on the trailing device, whereby such mechanism is operable with trailing devices of different resistances to elevation and forward motion; means carried by said draft means and extending forwardly of said means for connecting said draft means with the forward portion of said pulling device; and counterweighting means on said forwardly extending means for counterbalancing weight of the trailing device carried by said draft means.

9. Means for hitching a trailing drag device to a pulling device, comprising in combination: draft means for coupling the two devices together; means on said draft means adapted to support a trailing drag device; means on said draft means adapted to connect said draft means with a pulling device for vertical swinging movement and with the point of connection located on the forward portion of said pulling device; and counterweighting means connected with said draft means and extending forwardly of the means for connecting said draft means with a pulling device, said counterweighting means being adapted to counterbalance a drag device carried by said draft means; and means on the pulling device for elevating the portion of the draft means adapted to carry said drag device.

10. In combination: a tractor having a power lift device thereon together with a movable control member for governing the operation of said device; hitch means for not only trailingly connecting a ground working implement to said tractor but for also applying to said control member the differential between opposed first and second moments derived respectively from downwardly acting forces on said implement and from forces imposed on the implement by the soil in resistance to horizontal movement of the implement through the soil; and spring means associated with said control member for aiding said second moment in opposing movement of said control member by said first moment.

11. The combination of: a vertically movable implement hitch means for connecting an implement with a tractor; power means for moving said hitch means vertically to change the relationship of said implement to the soil; and control means for said power means including a member connected with the said implement for movement in response to variations in the reactive force resulting from the movement of the implement through the soil, a spring system balancing said movement of said control means and at least a part of the overhanging weight of said implement, and manually adjustable means for varying the balancing resistance of said spring system to said overhanging weight.

12. In a hitch for connecting an implement to a tractor having a power lift mechanism actuating elevator levers for moving the implement, the combination of: a linkage connecting the elevator levers to the implement adjacent its sides, whereby the implement may be drawn by the tractor and elevated by the lift mechanism; a rigid frame including two longitudinal members rigidly connected to said linkage and extending forwardly therefrom and forwardly of the tractor; means connecting said frame to the forward portion of the tractor, whereby the weight of the forward portion of the tractor is applied in opposition to the lifted weight of the implement; and weighting means carried by a forwardly extending portion of said rigid frame projecting forwardly of its point of connection to the tractor for counterbalancing the lifted weight of the implement.

13. A tractor hitch for hitching an implement to a tractor comprising, in combination, means including draft linkage for coupling the two devices together, a biased control member movable in response to an increase in resistance of the implement to forward movement for causing the draft linkage to be raised, auxiliary means including a resilient member mounted on said tractor, said resilient member being of the type in which displacement thereof is accompanied by a progressively increased restoring force, connector means connecting said auxiliary means and said control member so that at least a portion of the force exerted by said resilient member is transmitted to said control member to change the response thereof to implement draft resistance.

14. A tractor hitch for hitching an implement to a tractor comprising, in combination, means including draft linkage for coupling the two devices together, a biased control member movable in response to an increase in resistance of the implement to forward movement for causing the draft linkage to be raised, auxiliary means including a resilient member mounted on said tractor, said resilient member being of the type in which displacement thereof is accompanied by a progressively increased restoring force, connector means connecting said auxiliary means and said control member so that at least a portion of the force exerted by said resilient member is transmitted to said control member to change the response thereof to implement draft resistance, and means for adjusting the degree of force transmitted from said resilient member to said control member to enable use of such mechanism with implements having a wide variety of weights and resistance to forward movement.

15. A compensator for use with a tractor having a draft linkage for attaching a rearwardly overbalance implement, an automatic power lift device for raising said linkage and means including a normally biased control member movable against its bias for causing said lift device to be elevated to a position which depends upon the differential between draft force exerted by the implement and the degree of rearward overbalance comprising, in combination: means including a biased member for exerting a biasing force, means for mounting the same with respect to the tractor, means including a force transmitting member connecting said biased member and said control member for transmitting at least a portion of the force exerted by said biased member to said control member to react against the normal bias of the latter and thus change the response of the control member to the implement draft force and rearward overbalance, and adjusting means for adjusting the amount of force transmitted by said force transmitting member so that said tractor and the automatic power lift device thereon can be used for automatic operation with implements having a wide variety of rearward overbalance and draft force characteristics.

16. In combination in a compensating mechanism for an automatic lifting mechanism carried by a tractor, means for connecting an implement to said lifting mechanism, means including a control member and a first elastic member associated therewith, means rendering said control member elastically displaced in response to the resistance to draft of said implement to control said lifting mechanism and thus regulate the height of the implement, said implement connecting means being so constructed that the weight of the implement tends to counteract the effect of draft resistance thereof on said control member, means including a second elastic member on said tractor, said second elastic member being of the type in which displacement thereof is accompanied by a progressively increased restoring force, means abutting said second elastic member for holding the same under stress, and means including a force transmitting member for transmitting force from said stressed second elastic member so that it reacts on said control member, said force transmitting member being so arranged that the transmitted force tends to move said control member in the opposite direction from that which it tends to move under the influence of the weight of the implement so that said second elastic member compensatingly offsets at least a portion of the weight of said implement.

17. The combination of a tractor, hitch means for trailingly connecting an implement thereto with the implement exerting a downwardly acting force on such hitch means, power means for varying the operative relationship of such implement in the soil, a control system for said power means including control member movable in response to variations in ground reaction on the implement, means transmitting the downwardly acting force of said implement to said control member to modify the action of said control member in response to variations in ground reaction, means including an auxiliary biased member, means supporting said biased member with respect to the tractor, means for restraining said biased member against its force of bias and including a connection for transmitting at least a portion of the force of bias to said control member to oppose the effect of the downwardly acting force of said implement and thereby to limit the modifying action of such force on the response of the control member to variation in ground reaction.

18. An automatic depth control apparatus for ground-working implements of the type in which bodily shift of a movable control member by force derived from ground reaction on the implement is utilized to control a power actuated lift device and in which downward force on said implement tends to cause movement of said control member, characterized by the fact that there is combined with the control member means including a spring having means thereon for operatively associating the same with said control member for yieldingly resisting movement of the control member under the urging of the downward force exerted on the implement.

19. In combination: a pulling device; a trailing implement; draft means connecting said implement with said pulling device; lifting mechanism connected with said pulling device and with said draft means whereby the implement may be lifted through said draft means and the lifted weight of the implement placed on a forward portion of the pulling device; and means disposed forwardly of the pulling device for opposing lifted weight of the implement, said draft means including lever means connected with and placing said lifted weight on a forward portion of the pulling device, said forwardly disposed means on the pulling device being a counterweight on said lever.

20. In combination in a regulating mechanism for an automatic lifting mechanism carried by a tractor and adapted to regulate the height of an implement: elastic compression means responsive to increased resistance to horizontal draft of said implement; means for connecting said implement to said lifting mechanism to actuate the latter against compression of said elastic means by said increased resistance; and auxiliary means operatively connected with said elastic compression means to offset a portion of the weight of said implement, said auxiliary means including adjustable means to vary the condition of said compression means according to the weight of said implement.

CHARLES H. MARTIN.

REFERENCES CITED

The following references are of record in the file of this patent:

UNITED STATES PATENTS

| Number | Name | Date |
| --- | --- | --- |
| 2,105,117 | Graham | Jan. 11, 1938 |
| 2,123,555 | Morkovski | July 12, 1938 |
| 2,223,002 | Ferguson | Nov. 26, 1940 |
| 2,247,680 | Graham | July 1, 1941 |
| 2,273,875 | Livesay | Feb. 24, 1942 |
| 2,414,114 | Martin | Jan. 14, 1947 |

FOREIGN PATENTS

| Number | Country | Date |
| --- | --- | --- |
| 119,034 | Great Britain | May 12, 1921 |
| 539,003 | Great Britain | Aug. 25, 1941 |